US005091928A

United States Patent [19]

Robinette

[11] Patent Number: 5,091,928

[45] Date of Patent: Feb. 25, 1992

[54] LEAD AND LEAD OXIDE SCREENS FOR USE WITH X-RAY FILMS

[75] Inventor: Theodore D. Robinette, Hendersonville, N.C.

[73] Assignee: E. I. Du Pont de Nemours and Company, Wilmington, Del.

[21] Appl. No.: 398,104

[22] Filed: Aug. 24, 1989

[51] Int. Cl.[5] .............................................. G03B 42/04

[52] U.S. Cl. .................................... 378/185; 378/184; 250/483.1

[58] Field of Search ....................... 378/185, 182, 184; 250/483.11, 519.1

[56] References Cited

U.S. PATENT DOCUMENTS

| | | | |
|---|---|---|---|
| 3,859,090 | 1/1975 | Yoerger et al. | 430/536 |
| 3,924,127 | 12/1975 | Cheret et al. | 378/185 |
| 4,491,620 | 1/1985 | Joiner, Jr. | 378/185 |
| 4,608,301 | 8/1986 | Ishizuka et al. | 250/483.1 |

*Primary Examiner*—Janice A. Howell
*Assistant Examiner*—David P. Porta

[57] ABSTRACT

An improved intensifying lead screen for use with photographic, industrial X-ray films. This screen comprises a lead foil or lead oxide adhesively applied to a polyester support and optionally contains an overcoat or protective layer thereon.

7 Claims, 1 Drawing Sheet

LEAD AND LEAD OXIDE SCREENS FOR USE WITH X-RAY FILMS

BACKGROUND OF THE INVENTION

1. Field of the Invention

This invention relates to the field of radiography and more specifically to lead and lead oxide screens used to intensify images produced using industrial radiography. Still more particularly, this invention relates to an improved screens employing lead foils or lead oxide formulations applied to film supports and used with photographic industrial X-ray elements.

2. Discussion of the Prior Art

Industrial radiography is a system used to determine the quality of welds castings and metal or composite materials under stress or strain, such as the girders of bridges or the fuselages or wings of aircraft, for example. This system is also used to determine defects within smaller items such as various parts that cannot be visually inspected. Conventionally, a special photographic film is placed near the device to be radiographed, and X-radiation is applied thereto. Even though photographic, radiographic elements are not particularly sensitive to X-rays, large doses of these X-rays can be applied since they will not harm the items being examined in this manner. The use of lead and lead oxide containing screens and foils in conjunction with industrial, radiographic photographic elements to produce quality images, is well-known. These screens are conventionally comprised of a lead coating on paper or cardboard. These screens serve to intensify the radiographic image somewhat, and produce a sharper image by absorbing scattered X-rays, and find great utility within the described system. Flexibility is important within this system since it is sometimes necessary to wrap the film and screen around the item to be radiographed in order to obtain an image of the entire interior thereof. Although these screens are conventional, there are drawbacks to the use thereof since both the paper or cardboard support are not fully flexible and tend to kink, causing irregular absorption of radiation at this kink. Also, these supports tend to absorb moisture and this can adversely affect the photographic emulsion associated under vacuum there-with. Also, these supports add curl to the combination making handling very difficult. Also, paper can absorb X-radiation and thus interfere with the process of producing and X-ray image on the photo-graphic film.

It is also known to coat a layer comprising lead and lead oxide dispersed in a binder on various film supports. These elements have not met with wide spread acceptance since the problems of moisture absorption are still present and it is difficult and costly to apply lead in this manner to these supports.

SUMMARY OF THE INVENTION

It is an object of this invention to provide an improved X-ray screen lead intensifying system, one that does not have the drawbacks of the prior art elements. These and yet other objects are achieved by providing a lead screen for an X-ray photographic element comprising in order:

a) a flexible polymeric film support;

b) an adhesive layer applied to said support; oxide dispersed in a c) a layer of lead or lead binder applied supra to said adhesive layer; and, optionally, d) an overcoat layer.

DETAILS OF THE INVENTION

Figure 1:
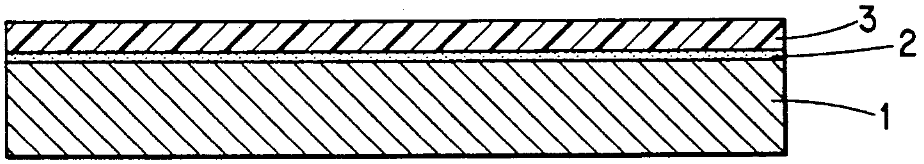
FIG. 1 is a side view showing of a lead or lead oxide (dispersed in a binder) screen of this invention with no overcoat layer.

Referring now specifically to the drawings which are an integral part of this invention, FIG. 1 shows a lead or lead oxide screen of this invention in which 1 is the polyester support, 2 is an adhesive layer and 3 is the lead foil layer. This embodiment uses no overcoat layer.

Figure 2:
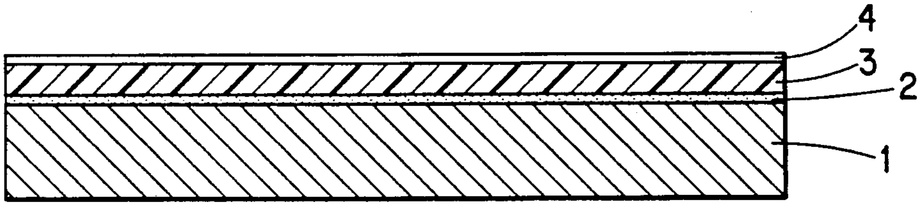
FIG. 2 is a side view showing of a lead or lead oxide (dispersed in a binder) screen of this invention with a lacquer overcoat layer.
Figure 3:
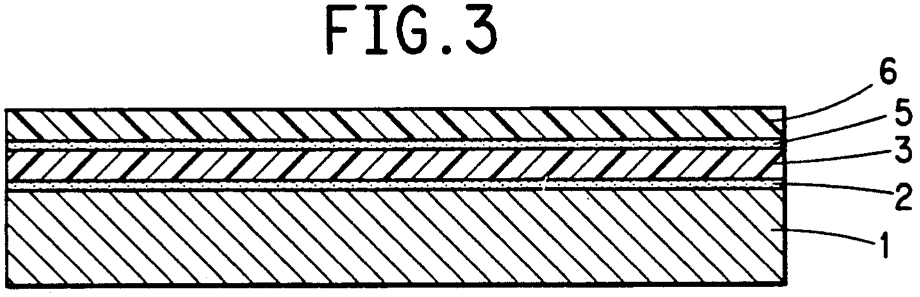
FIG. 3 is a side view showing of a lead or lead oxide (dispersed in a binder) screen of this invention with a film overcoat layer.

FIG. 2 is a showing of one embodiment using an overcoat layer wherein 1 is the polyester support, 2 is an adhesive layer, 3 is the lead foil layer (or lead oxide), and 4 is a lacquer layer applied as an overcoat layer. In FIG. 3, another embodiment employing an overcoat layer, 1 is the support, 2 and 5 are adhesive layers, 3 is the lead foil layer (or lead oxide) and 6 another, thin polyester layer as an overcoat.

It was surprising to find that the use of lead or lead oxide on polyester would produce such improved results and further that the application of an overcoat layer to this element would produce even greater utility. These screens can be cut, shaped and packaged to match the industrial application. The film support is radiologically translucent and therefor does not add to the absorption of the screen. Since there are no binders present and no paper products present, the new and novel lead intensifying screen of this invention does not hold moisture and curl and other undesirable side-effects are negated. The screens do not have susceptibility to absorption of moisture and have improved film/-screen content under adverse ambient conditions.

The film support 1 of the element of this invention can be made using any of the stable prior art films. These include cellulosic elements such as cellulose acetate and triacetate, polymerized vinyl compounds such as copolymerized vinyl acetate and vinyl chloride. Also to be mentioned are polystyrene and polymerized acrylates. Preferred films include those formed from the polyesterification product of a dicarboxylic acid and a dihydric alcohol made according to the teachings of Alles, U.S. Pat. No. 2,779,684 and the patents referred to in that specification. These films are particularly suitable because of their dimensional stability which is imparted by biaxial orientation and heat relaxation thereof. They are also preferred because of their high clarity and are conventionally known as Cronar® and Mylar® (E. de Nemours & Co.) and Melinex® (ICI, Ltd.) films. It is preferred that these supports have a thickness range of from 2 to 12 mils and preferably from 2 to 7 mils and most preferably 3 mils.

The lead or lead oxide element 3 used within the ambit of this invention is a lead foil or can be a lead oxide dispersed in a binder and these are commercially available. I prefer a lead foil of 0.01 to 0.04 mm in thickness and more preferably one of 0.02 to 0.03 mm in thickness, with that most preferred being about 0.0275 mm in thickness +/−8%. Analysis of the lead foil layer shows ca. 1.5% Sn, 2.5% Sb and 96.0% Pb. This lead foil is then applied to the film support using a conventional adhesive therefor. This is a commercially available adhesive such as UK 2600 mixed with Zappon® blue and supplied by BASF, Dusseldorf, W. Germany. Other adhesives can also be used as long as they are compatible with the lead layer and film and do not interfere with the recording of an X-ray image on any industrial, radiographic element designed to be used therewith. After application of a suitable layer of adhesive to the film support, the lead foil layer is then laminated thereto.

In place of the aforementioned lead foil layer, lead oxide dispersed in a suitable binder may be substituted therefor. Any of the conventional binders used for dispersing of phosphor containing intensifying screens may be used herein. These binders include polyvinyl butyral, polyvinyl acetate, urethane, polyvinyl alcohol, polyester resins, polymethylmethacrylates and the like. These binders are well-known in the prior art and do not normally absorb much of the incident X-radiation during use. Conventionally, the binders are mixed with a suitable solvent and conventional wetting agents and the like to aide in the dispersion of the lead oxide therein. The level of binder present should be kept low in order to preclude X-ray absorption thereby.

Generally an upper limit of the lead or lead oxide thickness will be 0.06 inches (0.15 mm).

An overcoat or barrier layer (5 and 6 in the drawings) may be optionally present in the lead foil screen of this invention, in fact it is so preferred in applications where vacuum is applied. Although conventional, thin transparent film elements such as polyethylene terephthalate may be applied as this overcoat, I prefer the application of a lacquer layer in place of films because this layer permits easy passage of lead electrons during intensification. Any of the conventional, well-known lacquers may be used to provide a thin, tough, transparent overcoat for the lead foil or lead oxide screen of this invention. The overcoat will allow intimate contact between the screen and the photographic element under vacuum which provides even better results Additionally, the overcoat tends to protect the lead foil layer and thus reduce defects caused by improper handling The film overcoats may be applied using an adhesive similar to that employed to insure the lead containing composition sticks to the film. The lacquers may be applied as a liquid by any conventional manner and dried to form a tough, smooth overcoat finish to the element. Lacquer can be specifically formulated to retard the buildup of static charge and it is known that lacquer coatings thicker than 0.5 g/m$^2$ tend to build a static charge.

EXAMPLE 1

In order to exemplify this invention, the following screen was prepared:

A thin (ca. 2.95 mils), clear polyethylene terephthalate film support (Melinex®, ICI Corp.) was coated with an adhesive (Liofol® UK 2600, Henkel kGaA, Dusseldorf, W. Germany) at 3 g/m$^2$ (ca. 1 mil in thickness) A 0.275 mm lead foil (described above) was then laminated to this support and allowed to dry to insure good adhesion thereto. A lacquer layer comprising polymerized polyvinyl chloride (Product #90LA743, Gebr-Schmidt, W. Germ.) was coated on this adhesive layer to a thickness of no greater than 0.5 g/m$^2$ and dried. A flexible, lead screen was obtained from this structure.

In order to test the efficacy of the lead foil screen prepared above, 8″×10″ samples of the screen were placed on both sides of a commercially available, industrial X-ray photographic film element (NDT70, E. I. du Pont de Nemours & Co., Wilmington, Del.) and these samples were placed in a vacuum tight envelope in a tropical oven for two weeks at 72° F. and 65% relative humidity. The industrial X-ray films were then developed to find that the fog level had increased only 0.055 in density which is quite acceptable.

Another sample of lead foil was then tested by exposure to X-rays in contact with a sample of the aforementioned NDT70 industrial X-ray film. For control purposes, a sample of the same film was exposed to a conventional lead intensifying screen (lead coated on a paper support) but not in a vacuum as the moisture in the paper would destroy the film. The exposure was at 200 kVp and 10 ma. The following results were obtained.

| Sample | Speed | Avg. Gradient | Base + Fog |
|---|---|---|---|
| Of This Invention | 324 | 6.15 | 0.21 |
| Control | 312 | 6.24 | 0.34 |

The results from this test are obvious. The sample of this invention had similar speed and lower fog than the control while the average gradient was well within testing limits. This proves that the invention can be used with its improvements to replace conventional screens and can even be used in vacuum. Still other samples of the lead foil screen of this invention, as made in this example, was tested at various kVp exposure levels using the aforementioned NDT70 film. A smooth density rise was obtained when using a conventional stepwedge. This test indicated that had we been evaluating a conventional air-craft wing for defects, for example, the defects could easily have been detected using the system of this invention.

EXAMPLE 2

In yet another example, an adhesive layer (see Example 1) and a thin layer of polyester was applied as an overcoat layer in place of the lacquer layer of Example 1. The remainder of the structure was identical. Superior photo effects were achieved with this screen as compared to controls (paper coated, conventional lead screens) having no overcoat.

EXAMPLE 3

In another example, a lead foil screen without an overcoat layer was prepared as described in Example 1 but not in a vacuum envelope. This element was also successful in producing excellent sensitometric results on exposure to industrial X-ray films, for example. However, care had to be taken to insure that no damage occurred to the lead foil layer without an overcoat layer.

EXAMPLE 4

To compare lead foil screens of this invention further with the prior art, samples of each of the screens made as described above, were placed in contact with some industrial X-ray film in a vacuum pack and further placed for two weeks in the tropical oven described above. Samples of a conventional, lead coating on paper were placed in the same oven in contact with the same film. One of the paper screens was dried and another was allowed to absorb moisture from room atmosphere of 65% relative humidity and 72° F. This sample was considered "wet". At the end of the testing period, the wet paper screen had badly fogged the film, the dried paper screen and the uncoated polyester screen also fogged the film but over less area and to a lesser density. The lacquer and polyester overcoated screens produced no fog. Since paper conventionally tends to pick up moisture on standing, this test indicated the efficacy of the lead foil screens of this invention.

What is claimed is:

1. A flexible lead or lead oxide absorbing screen for an x-ray photographic element consisting essentially of in order:

a) a flexible polymeric film support;

b) an adhesive layer applied on said film support;

c) a flexible layer of lead or lead oxide dispersed in a binder;

d) an overcoat layer wherein said flexible layer of (c) contacts said overcoat layer of (d).

2. The screen of claim 1 wherein said overcoat layer is a lacquer overcoat.

3. The screen of claim 2 wherein said support is a thin polyester film.

4. The screen of claim 1 wherein said support is a biaxially oriented polyethylene terephthalate film having a thickness of from 2 to 12 mils.

5. The screen of claim 1 wherein said flexible layer contains lead.

6. The screen of claim 5 wherein said lead comprises 1.5% Sn, 2.5% Sb and 96.0% Pb of a thickness of 0.01 to 0.04 mm.

7. The screen of claim 1 wherein the thickness of the lead or lead oxide layer is not greater than about 0.06 inches.

* * * * *